US012424803B2

(12) United States Patent
Garrett et al.

(10) Patent No.: US 12,424,803 B2
(45) Date of Patent: Sep. 23, 2025

(54) ELECTRONIC CABLE HAVING CONNECTORS WITH AN ILLUMINATING LENS

(71) Applicant: Jem Accessories, Inc., Edison, NJ (US)

(72) Inventors: Jennifer Garrett, Rahway, NJ (US); Elie Chemtob, Eatontown, NJ (US)

(73) Assignee: Jem Accessories, Inc., Woodbridge, NJ (US)

(*) Notice: Subject to any disclaimer, the term of this patent is extended or adjusted under 35 U.S.C. 154(b) by 267 days.

(21) Appl. No.: 17/946,014

(22) Filed: Sep. 15, 2022

(65) Prior Publication Data

US 2023/0013647 A1 Jan. 19, 2023

Related U.S. Application Data

(63) Continuation of application No. PCT/US2021/023227, filed on Mar. 19, 2021.

(60) Provisional application No. 62/991,643, filed on Mar. 19, 2020.

(51) Int. Cl.

| | |
|---|---|
| ***H01R 13/717*** | (2006.01) |
| ***H01R 13/502*** | (2006.01) |
| *H01R 24/60* | (2011.01) |
| *H01R 24/62* | (2011.01) |
| *H01R 107/00* | (2006.01) |

(52) U.S. Cl.

CPC ....... *H01R 13/7175* (2013.01); *H01R 13/502* (2013.01); *H01R 24/60* (2013.01); *H01R 24/62* (2013.01); *H01R 2107/00* (2013.01)

(58) Field of Classification Search

CPC .. H01R 13/7175; H01R 13/502; H01R 24/60; H01R 24/62; H01R 2107/00; H01R 13/7172; H01R 31/065

See application file for complete search history.

(56) References Cited

U.S. PATENT DOCUMENTS

| | | | | |
|---|---|---|---|---|
| 8,740,640 | B2 * | 6/2014 | Hardy | H01R 13/7175 439/490 |
| 10,109,957 | B2 * | 10/2018 | Johnson | H01R 13/6599 |
| 10,658,799 | B2 * | 5/2020 | Hsu | H01R 24/60 |
| D937,215 | S * | 11/2021 | Garrett | D13/133 |
| 2005/0260884 | A1 * | 11/2005 | Yueh | H01R 13/6691 439/488 |
| 2009/0203266 | A1 * | 8/2009 | Chuang | H01R 13/6666 439/701 |
| 2010/0068934 | A1 * | 3/2010 | Li | H01R 13/627 439/660 |

(Continued)

*Primary Examiner* — Abdullah A Riyami
*Assistant Examiner* — Nader J Alhawamdeh
(74) *Attorney, Agent, or Firm* — Goldberg Cohen LLP

(57) ABSTRACT

An electronic cable of the type having a plurality of electrical leads extending between an electronic signal interface connector assembly at each end thereof is provided wherein each electronic signal connector assembly comprises an electronic signal connector having a plurality of signal contacts within a grounding sleeve, each electrical lead being connected to a signal contact. A backshell supports the electronic signal connector extending therefrom. A lens extends about the periphery of the backshell and is affixed thereto. A light emitting diode within the backshell is electrically connected between a power lead and a ground lead and is further oriented to emit light at the lens when energized.

29 Claims, 15 Drawing Sheets

(56) References Cited

U.S. PATENT DOCUMENTS

| | | | | |
|---|---|---|---|---|
| 2012/0064758 | A1* | 3/2012 | Grice | H01R 13/641 439/490 |
| 2017/0047695 | A1* | 2/2017 | Ma | H01R 13/631 |
| 2017/0062998 | A1* | 3/2017 | Ma | H01R 13/6658 |
| 2017/0222370 | A1* | 8/2017 | Johnson | H01R 13/6599 |
| 2017/0302034 | A1* | 10/2017 | Johnson | H01R 13/6581 |
| 2018/0241161 | A1* | 8/2018 | Hsu | H01B 11/1834 |
| 2023/0013647 | A1* | 1/2023 | Garrett | H01R 13/7175 |

* cited by examiner

ELECTRONIC CABLE HAVING CONNECTORS WITH AN ILLUMINATING LENS

PRIORITY APPLICATIONS

The present application is a continuation of PCT/US2021/023227 filed 19 Mar. 2021, which claims the priority of U.S. Provisional Application Ser. No. 62/991,643 filed 19 Mar. 2020, all of which are fully incorporated herein by reference.

BACKGROUND OF THE INVENTION

Home electronics and personal electronics had their infancy in the mid-20$^{th}$ century. At that time, each individual component had at most two electrical/electronic interfaces. One interface was with the power grid to deliver electrical power to the component and a second interface may have included the connection of an antenna to the rear of an analog radio or television. Component stereo systems ushered in a phase of component-to-electronic interfaces. These interfaces typically comprised a two-lead wire which may have been connected to a component utilizing a bare lead connected to a terminal or alternatively, terminated with a commonly used RCA-plug. These connections were typically few and unique in configuration, and thus, relatively easy to categorize.

The latter half of the 20$^{th}$-century and the beginning of the 20-century have ushered in the digital age wherein the electrical/electronic devices are no longer stand-alone items but are now components in an ever-expanding electronic system. Such systems can include personal computers, printers, monitors, stand-alone hard drives, digital televisions, and other peripheral devices. These devices can be electronically communicative one with the other as part of a wireless intra-net, or by being hardwired one with the other via electronic signal cables. Typically, the devices within the electronic system are interconnected with a combination of hard wires or wireless signals.

The communication interfaces differ from device to device and include such interfaces as ethernet cables for connecting computers together in a Local Area Network (LAN), Universal Serial Bus (USB), High-Definition Multimedia Interface (HDMI), Lightning, Firewire, and others. Each of the cables utilized for these protocols can have one or more unique connector types associated therewith. Thus, an LAN comprising multiple devices will typically have several different signal cables associated therewith terminating at a central point such as a personal computer. Television is no longer a single device but is typically a system including a cable TV device, a monitor, one or more DVD/Blu-ray devices, and a sound system wherein all devices are interconnected with electronic signal cables.

These multitudes of hard-wired electronic signal cable connections can easily become confusing, especially when many of the electronic signal cables are of the same type such as multiple HDMI connections. Further, these electronic signal cables most often plug into the electronic devices at a rear panel thereof where the lighting is minimal and thus difficult to see. Therefore, there is a need for electronic interface cables of the same type which are readily discernible one from another and which are also readily visible in an area of minimal illumination.

SUMMARY OF THE INVENTION

In accordance with one aspect the invention, an electronic cable of the type having a plurality of electrical leads extending between an electronic signal interface connector assembly at each end thereof is provided wherein each electronic signal connector assembly comprises a backshell supporting an electronic signal connector extending from one end thereof. The electronic signal connector has a plurality of signal contacts within a grounding sleeve, the signal contacts conductively affixed to respective ones of the plurality of electrical leads. A light transmissible lens is affixed to the backshell and extends across a cross-section of the backshell wherein a periphery of the lens conforms to an external periphery of the backshell. A light emitting diode is positioned within the backshell and is proximate to the lens. The light emitting diode is electrically connected between a power lead and a ground lead within the backshell and is oriented to emit light at the lens when energized.

In another aspect of the invention, the light transmissible lens is affixed to an end of the backshell and is positioned at an interface of the backshell and the electronic signal connector.

In a further aspect of the invention, the light transmissible lens transects the backshell.

In another aspect of the invention, when the light emitting diode in the electronic signal connector assembly is energized, the light transmitted through the lens illuminates about the external periphery of the backshell and further illuminates the electronic signal connector.

In an additional aspect of the invention, the light transmissible lens transects the backshell at a right angle with respect to a longitudinal axis of the connector backshell.

In yet another aspect of the invention, the light transmissible lens transects the backshell at an acute angle with respect to a longitudinal axis of the connector backshell.

A further aspect of the invention includes when the light emitting diode in the electronic signal connector assembly is energized, the light transmitted through the lens illuminates an area about an external periphery of the backshell.

In yet an additional aspect of the invention, the lens is transparent.

In a further aspect of the invention, the lens is translucent.

In an additional aspect of the invention, the light emitting diode in each electronic signal connector assembly emits the same color.

In yet another aspect of the invention, the light emitting diode in each electronic signal connector assembly emits white light and each light transmissible lens is tinted the same color.

In yet a further aspect of the invention, an electronic cable of the type having a plurality of electrical leads extending between an electronic signal interface connector assembly at each end thereof wherein each electronic signal interface connector assembly comprises a backshell supporting an electronic signal connector at one end thereof. The electronic signal connector is selected from a group consisting of the types HDMI, USB-A, micro-USB, and USB-C. The electronic signal connector has a plurality of signal contacts within a grounding sleeve wherein the signal contacts are conductively affixed to respective ones of the plurality of electrical leads. A light transmissible lens is affixed to the backshell and extends across a cross-section of the backshell. A periphery of the lens conforms to the external periphery of the backshell. A light emitting diode is positioned within the backshell and is proximate to the lens. The light emitting diode is further electrically connected between a power lead and a ground lead within the backshell and is positioned proximate to the light transmissible lens. The light emitting diode is oriented to emit light at the lens when energized thereby transmitting light through the lens and illuminating an area external to and at least about an external periphery of the backshell.

In yet an additional aspect of the invention, the light transmissible lens is affixed to an end of the backshell and is positioned at an interface of the backshell and the electronic signal connector.

In a further aspect of the invention, the light transmissible lens transects the backshell at a right angle with respect to a longitudinal axis of the connector backshell.

In another aspect of the invention, the light transmissible lens transects the backshell at an acute angle with respect to a longitudinal axis of the connector backshell.

In an additional aspect of the invention, the light transmissible lens is translucent.

In yet a further aspect of the invention, the light transmissible lens is transparent.

In another aspect of the invention, the light emitting diode in each electronic signal connector assembly emits the same color.

In yet an additional aspect of the invention, the light emitting diode in each electronic signal connector assembly emits white light and each light transmissible lens is tinted the same color.

In a further aspect of the invention, an electronic cable of the type having a plurality of electrical leads extending between an electronic signal interface connector assembly at each end thereof. Each electronic signal interface connector assembly comprises a backshell supporting an HDMI connector extending from one end thereof. The HDMI connector has a plurality of signal contacts within a grounding sleeve and the signal contacts are conductively affixed to respective ones of the plurality of electrical leads. A light transmissible translucent lens is affixed to an end of the backshell at an interface between the backshell and the HDMI connector. The lens extends across a cross-section of the backshell such that a periphery of the lens conforms to the external periphery of the backshell. A monochromatic light emitting diode is positioned within the backshell proximate to the lens and electrically connected between a power lead and a ground lead within the backshell. When energized, each light emitting diode emits light of the same color through the light transmissible lens and illuminates an area about the external periphery of the backshell and further illuminates the electronic signal connector.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The invention relates to the field of electronics in general, and more particularly to the design and construction of electronic signal cables having electronic signal connector assemblies at one or both ends to communicatively interconnect two electronic devices. In accordance with the design and construction of these electronic signal cables, a light emitting diode within the connector back shell at each end of the electronic cable illuminates a translucent lens to color code the cable and illuminate the cable connection.

Figure 1:
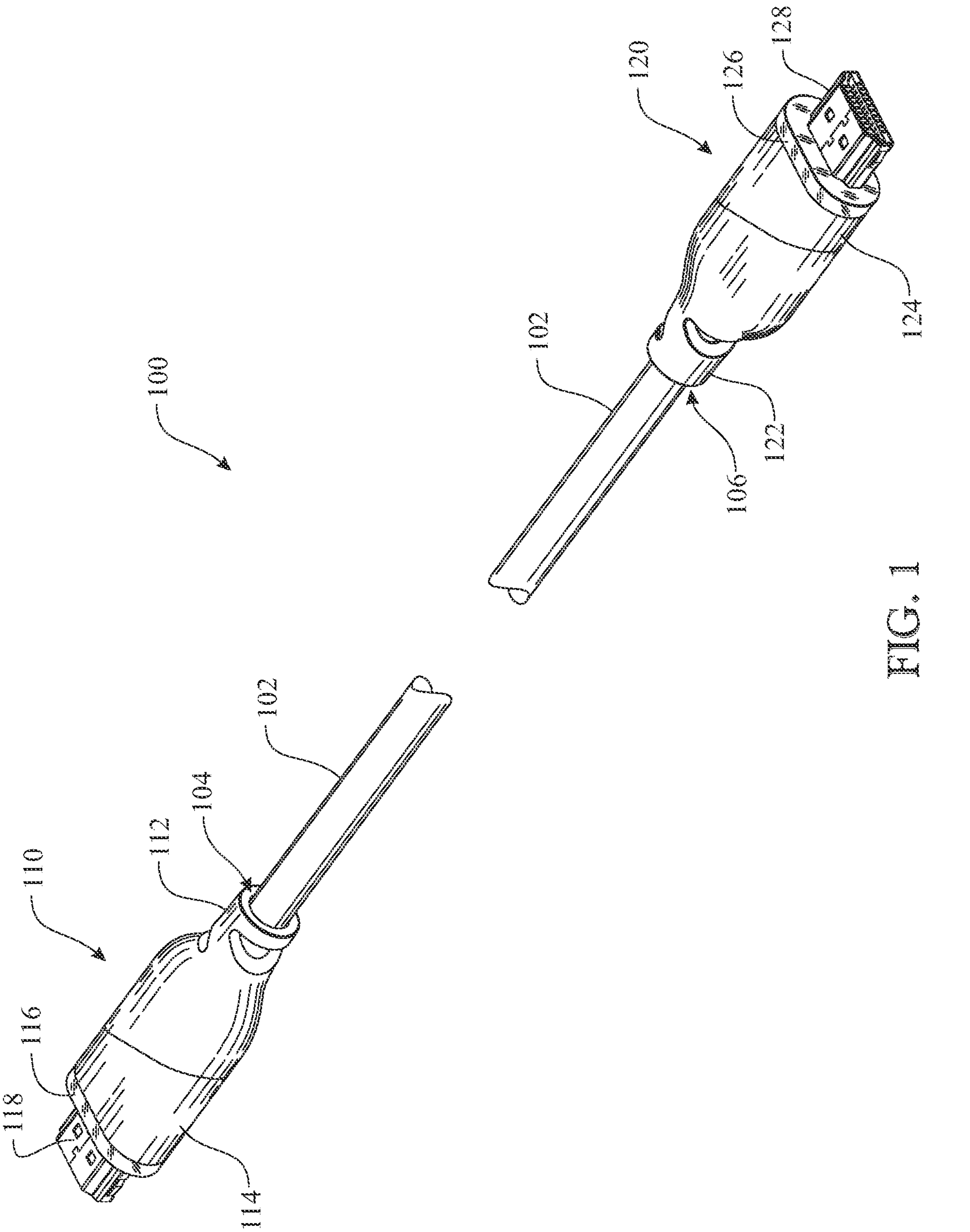
FIG. 1 presents a top isometric view of an HDMI electronic cable having HDMI connectors with an illuminating end cap lens.
Figure 2:
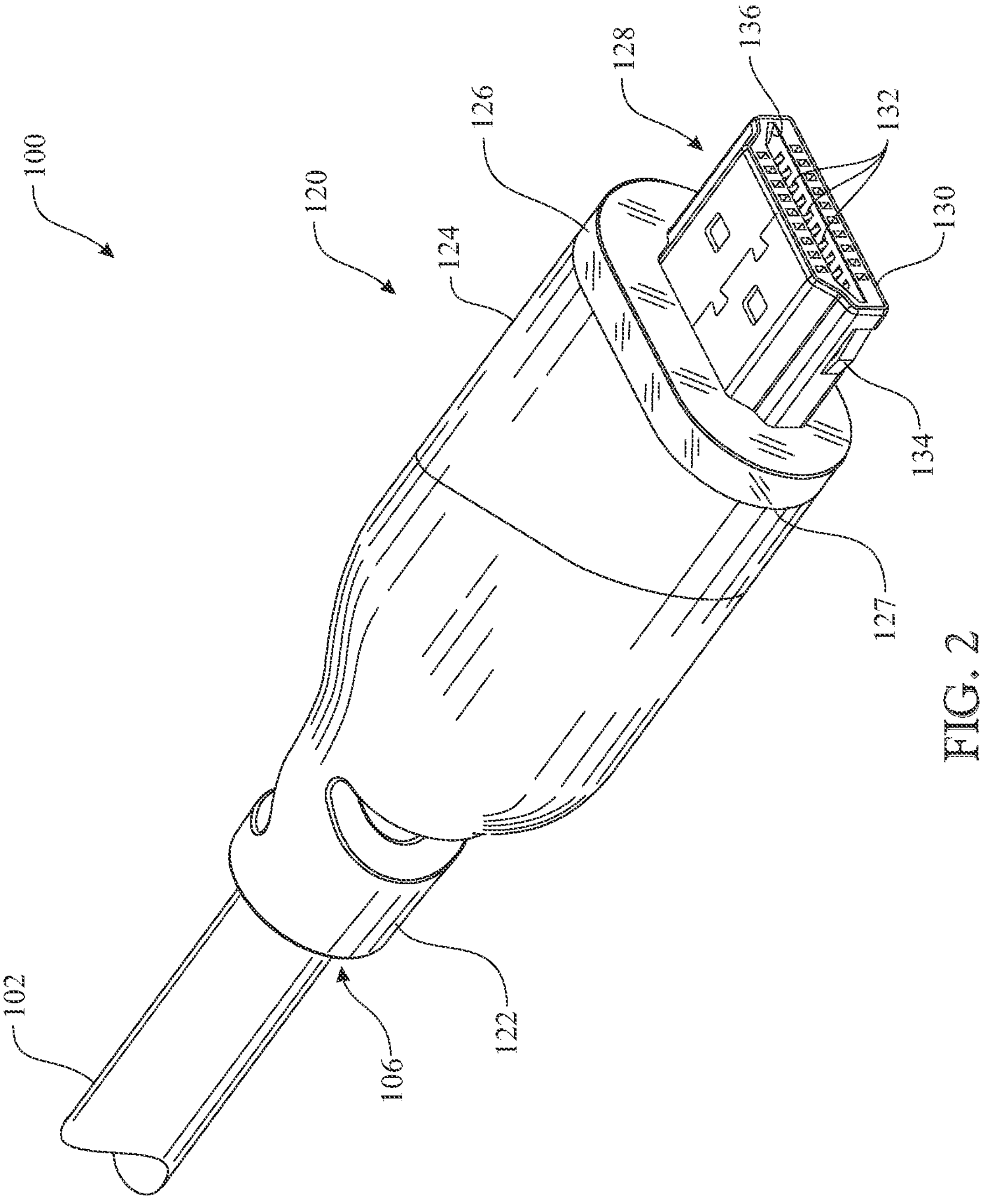
FIG. 2 presents an enlarged top isometric view of one of the HDMI connector assemblies of the HDMI electronic cable of FIG. 1.
Figure 13:
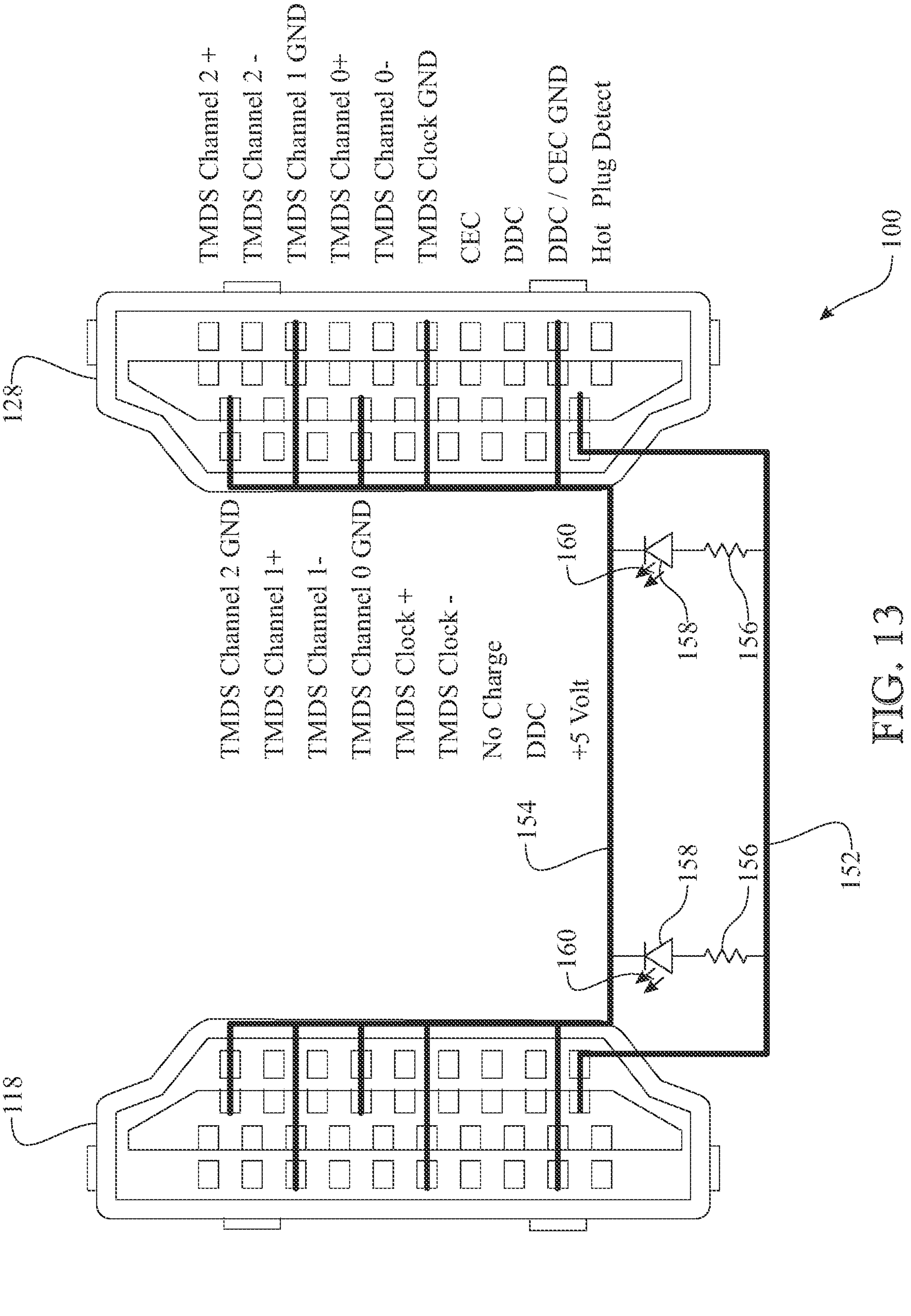
FIG. 13 presents an electrical schematic of the electronic cable of FIG. 1.

In one embodiment of the invention and as illustrated in FIGS. 1, 2, and 13, an HDMI electronic cable assembly 100 is shown wherein a first HDMI connector assembly 110 according to the present invention is affixed at a first end 104 of a multi-lead cable 102. A second HDMI connector assembly 120 according to the present invention is affixed at a second end 106 of the cable 102. Each connector assembly 110, 120 includes at an end thereof an HDMI connector 118, 128, respectively of a known configuration as shown in FIG. 2. The HDMI connector 128 (connector 118 being identical thereto) is of a plug configuration with a grounding sleeve 130 including friction tabs 134 on each side thereof for retaining the HDMI connector plug 128 in a receiving HDMI socket (not shown). The grounding sleeve 130 forms a cavity 136 in which a plurality of signal contacts 132 are arranged for interfacing with like mating contacts in a receiving HDMI socket (not shown).

The HDMI connector assembly 110, 120, and as more clearly shown in FIG. 2, includes an interface area 127 between a backshell 124 and the HDMI connector 128. Also positioned at the interface area 127 is an end cap lens 126 which is transmissible to light. The end cap lens 126 is preferably translucent but can alternately be transparent. The end cap lens 126 extends across a cross section of the backshell such that a periphery of the end cap lens 126 conforms to the periphery of the backshell 124. The end cap lens 126 is affixed to the back shell 124 by chemical bonding, press fit, or other methods known in the art and compatible with the respective materials of the backshell 124 and the end cap lens 126. A strain relief 122 is affixed to and extends from, or is integral with, the back shell 124 to engage the cable 102 in a manner well known in the art.

Within the back shell 124 the individual signal conductors are conductively affixed to the various electrical contacts 132 according to industry standards for HDMI connectors. A light emitting diode (LED) 158 is positioned within the backshell 124 and proximate to the end cap lens 126. As illustrated in FIG. 13 a resistor 156 is connected in series between the anode of the light emitting diode (LED) 158 and the +5 Volt conductor 152. The cathode of the LED 158 is connected to the ground conductor 154.

In use, the electronic cable assembly 100 is utilized to interconnect two electronic devices such as a personal computer and a video monitor. When one of the connector assemblies 110, 120 is connected to a powered HDMI socket on one of the devices, the +5 V power energizes the LED 158 which then emits a visible light 160 thereby illuminating the translucent end cap lens 126 wherein the illuminated end cap lens 126 further illuminates the HDMI connector 120 extending therefrom. The LED 158 can be chosen from a series of monochromatic LEDs such that the light 160 emitted by the LED is of a predetermined color wherein the connector assemblies 110, 120 emit the same color when energized. Thus, the cable 100 is color-coded and each cable 100 utilized can be coded with a different color thereby readily distinguishing one electronic interface from another. Alternatively, the LED 158 can be of a type emitting white light when energized and the end cap lens 126 can be tinted a desired color. Further, the illumination from the LED 158 through the end cap lens 126 functions to illuminate the device panel into which the connector assembly 110, 120 is received thereby aiding the user to visualize the connections.

Figure 3:
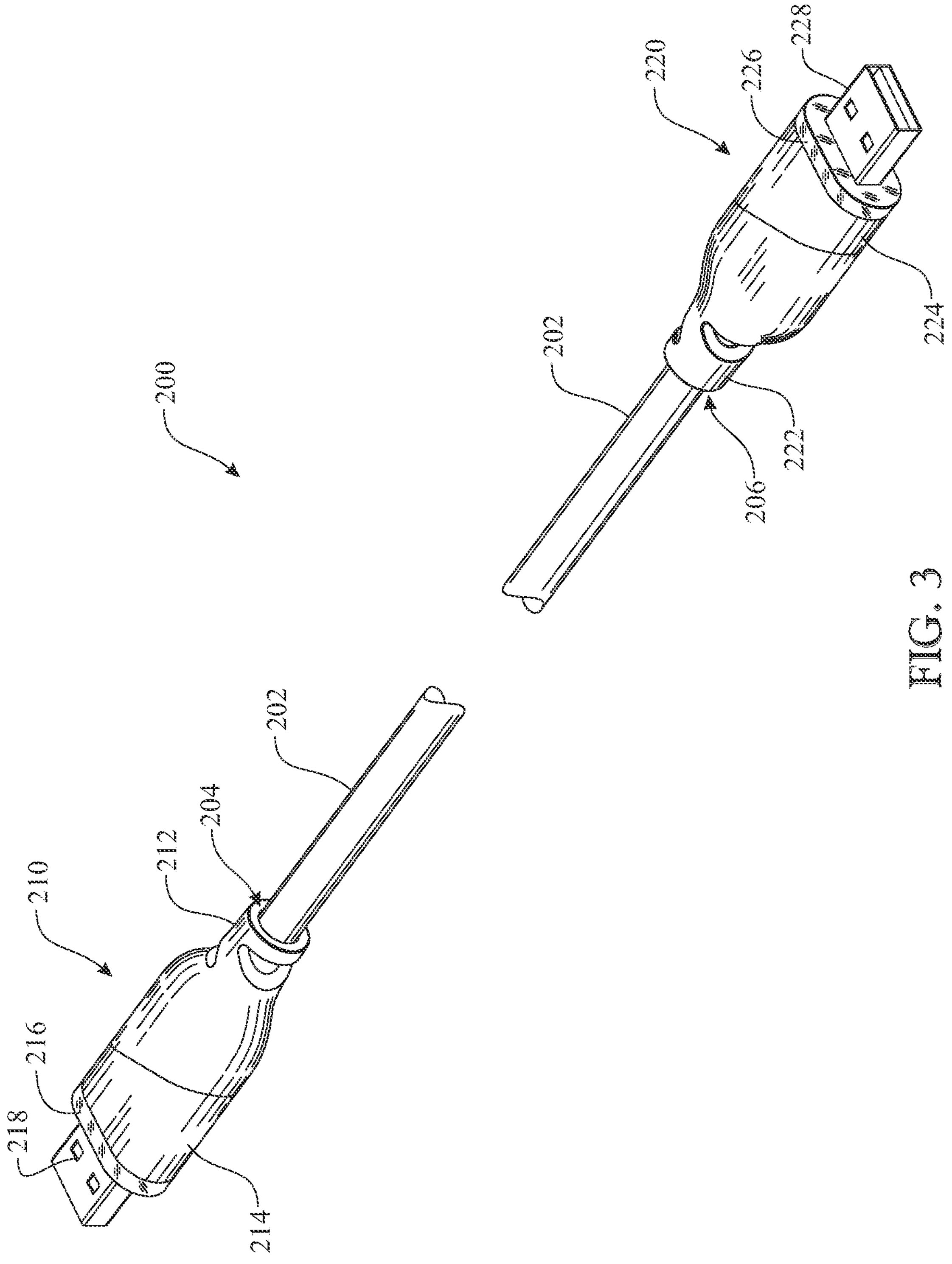
FIG. 3 presents a top isometric view of a USB electronic cable having USB-A connectors with an illuminating end cap lens.
Figure 4:
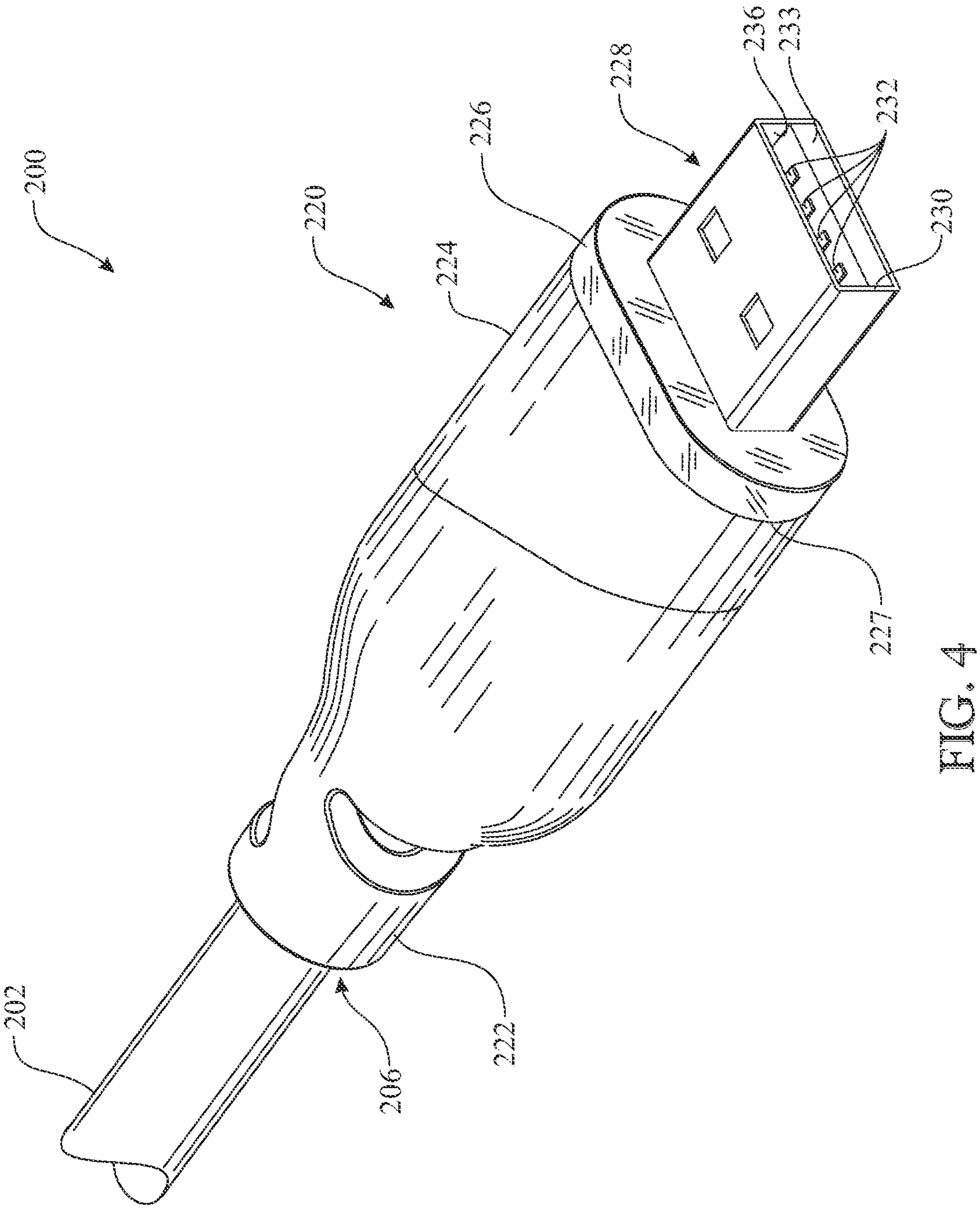
FIG. 4 presents an enlarged top isometric view of one of the USB-A connector assemblies of the USB electronic cable of FIG. 3.
Figure 5:
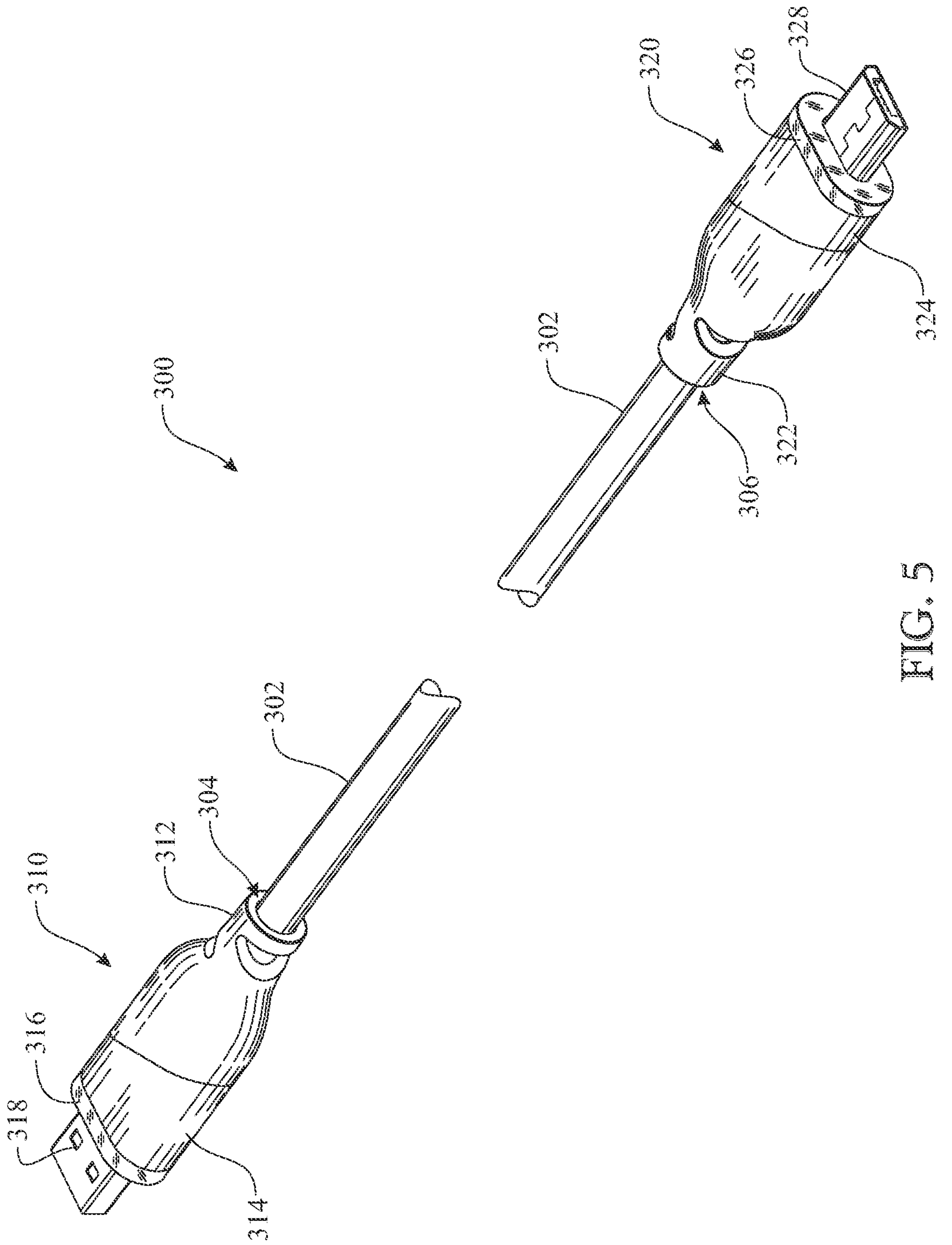
FIG. 5 presents a top isometric view of a USB electronic cable having a USB-A connector assembly with an illuminating end cap at one end thereof and a micro-USB connector assembly with an illuminating end cap lens at an opposite end thereof.
Figure 14:
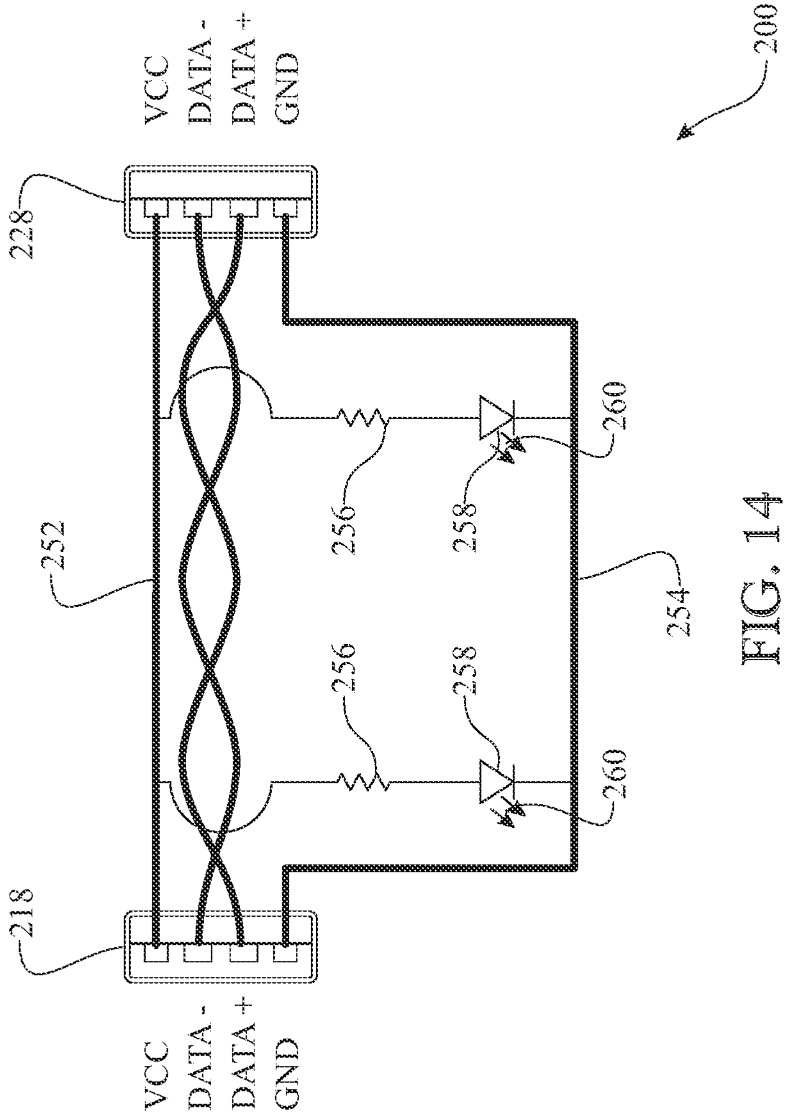
FIG. 14 presents an electrical schematic of the electronic cable of FIG. 3.

In another embodiment of the invention and as illustrated in FIGS. 3, 4, and 14, an electronic cable assembly 200 is shown wherein a first USB-A connector assembly 210 according to the present invention is affixed at a first end 204 of a multi-lead cable 202. A second USB-A connector assembly 220 according to the present invention is affixed at a second end 206 of the cable 202. Each connector assembly 210, 220 includes at an end thereof a USB-A connector 218, 228 respectively of a known configuration as shown in FIG. 3. The USB-A connector 228 (connector 219 being identical thereto) is of a plug configuration with a grounding sleeve 230. The grounding sleeve 230 forms a cavity 236 in which a plurality of signal contacts 232 are embedded in a plastic insert 233 and arranged for interfacing with like contacts in a receiving USB-A socket (not shown).

The USB-A connector assembly 210, 220, and as more clearly shown in FIG. 4 (connector assembly 220 is shown and connector assembly 210 is identical thereto), includes an interface area 227 between a backshell 224 and the USB-A connector 228. Also positioned at the interface area 227 is an end cap lens 226 which is transmissible to light. The end cap lens 226 extends across a cross section of the backshell such that a periphery of the end cap lens 226 conforms to the periphery of the backshell 224. The end cap lens 226 is affixed to the back shell 224 by chemical bonding, press fit, or other methods known in the art compatible with the respective materials of the backshell 224 and the end cap lens 226. A strain relief 222 is affixed to and extends from, or is integral with, the back shell 224 to engage the cable 202 in a manner well known in the art.

Within the back shell 224 the individual signal conductors are conductively affixed to the various electrical contacts 232 according to industry standards for USB-A connectors. A light emitting diode (LED) 258 is positioned within the backshell 224 and proximate to the end cap lens 226. As illustrated in FIG. 14 a resistor 256 is connected in series between the anode of the light emitting diode (LED) 258 and the VCC lead 252. The cathode of the LED 258 is connected to the ground conductor (GND) 254.

In use, the electronic cable assembly 200 is utilized to interconnect two electronic devices such as a personal computer and a printer. When one of the connector assemblies 210, 220 is connected to a powered USB-A socket on one of the devices, the electrical power on the VCC lead 252 energizes the LED 258 which then emits a visible light 260 thereby illuminating the translucent end cap lens 226 wherein the illuminated end cap lens 226 further illuminates the USB-A connector 220 extending therefrom. The LED 258 can be chosen from a series of monochromatic LEDs such that the light 260 emitted by the LED is of a predetermined color wherein the connector assemblies 210, 220 emit the same color when energized. Thus, the cable 200 is color-coded and each cable assembly 200 utilized can be coded with a different color thereby readily distinguishing one electronic interface from another. Alternatively, the LED 258 can be of a type emitting white light when energized and the end cap lens 226 can be tinted a desired color. Further, the illumination from the LED 258 through the end cap lens 226 functions to illuminate the device panel into which the connector assembly 210, 220 is received thereby aiding the user to visualize the connections.

In yet another embodiment of the invention and as illustrated in FIGS. 5, 6, 7 and 15, an electronic USB cable assembly 300 is shown wherein a first USB-A connector assembly 310 according to the present invention and identical to USB-A connector assembly 210 is affixed at a first end 304 of a multi-lead cable 302. A second connector assembly, this a micro-USB connector assembly 320 according to the present invention is affixed at a second end 306 of the cable 302 and is identical to micro-USB connector assembly 420 as described below.

Figure 6:
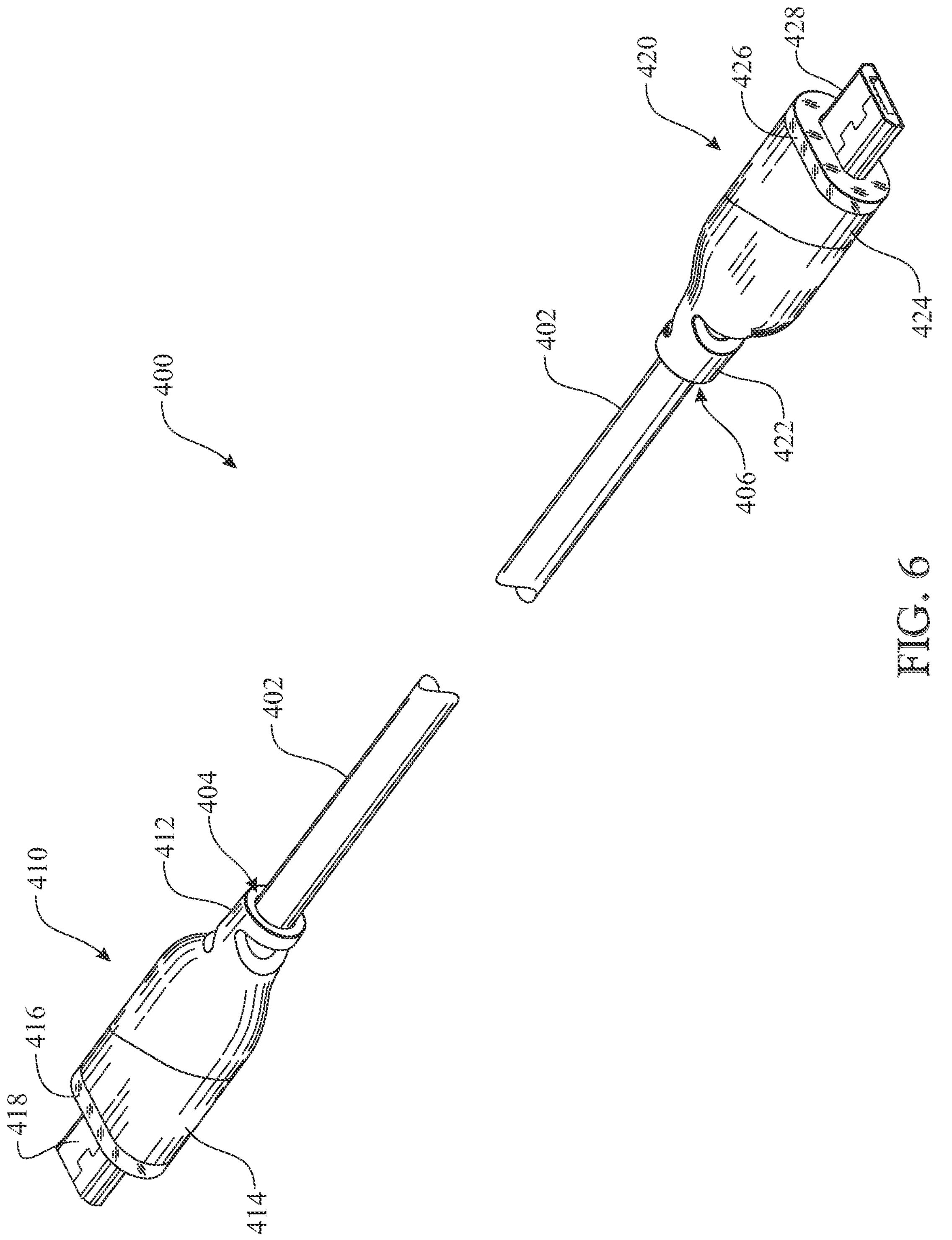
FIG. 6 presents a top isometric view of a USB electronic cable having micro-USB connectors with an illuminating end cap lens at each end thereof.

A similar USB cable assembly 400 is illustrated in FIG. 6 wherein a first micro-USB connector assembly 410 according to the present invention is affixed at a first end 404 of a multi-lead cable 402. A second micro-USB connector assembly 420 according to the present invention is affixed at a second end 406 of the cable 402. Each connector assembly 410, 420, as further shown in FIG. 7 (connector assembly 410 being identical to connector assembly 420), includes at an end thereof a micro-USB connector 418, 428 respectively, of a known configuration. The micro-USB connector 428 is of a plug configuration with a grounding sleeve 430. The grounding sleeve 430 forms a cavity 436 in which a plurality of signal contacts 432 are arranged for interfacing with like contacts in a receiving micro-USB socket (not shown).

Figure 7:
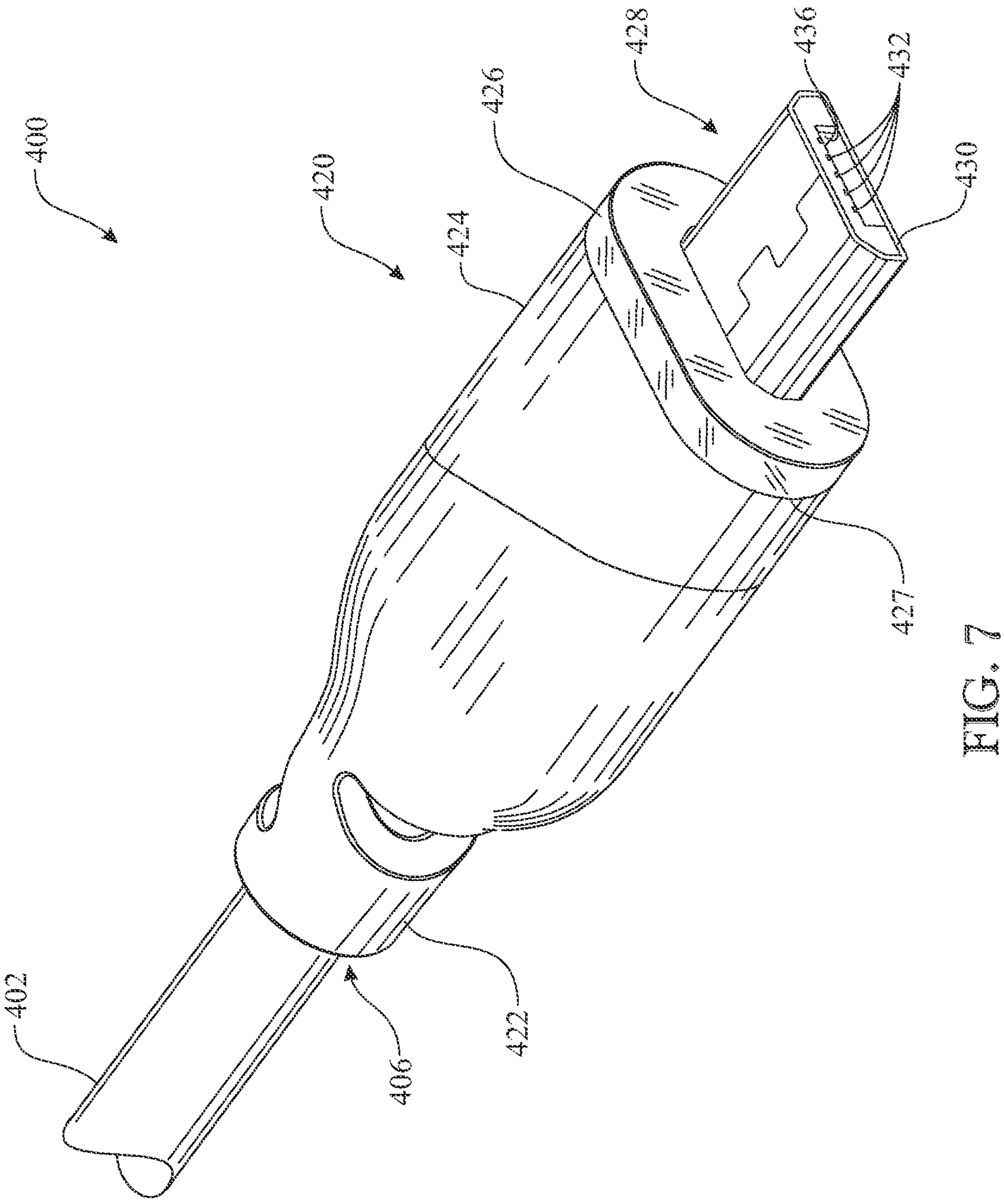
FIG. 7 presents an enlarged top isometric view of the micro-USB connector assemblies of the USB electronic cable of FIG. 6.

The micro-USB connector assemblies 320, 410, and 420, are identical and as more clearly shown in FIG. 7 illustrating connector assembly 420, each includes an interface area 427 between a backshell 424 and the micro-USB connector 428. Also positioned at the interface area 427 is an end cap lens 426 which is transmissible to light. The end cap lens 426 extends across a cross section of the backshell 424 such that a periphery of the end cap lens 426 conforms to the periphery of the backshell 424. The end cap lens 426 is affixed to the back shell 424 by chemical bonding, press fit, or other methods known in the art compatible with the respective materials of the backshell 424 and the end cap lens 426. A strain relief 422 is affixed to and extends from, or is integral with, the back shell 424 to engage the cable 402 in a manner well known in the art.

Figure 15:
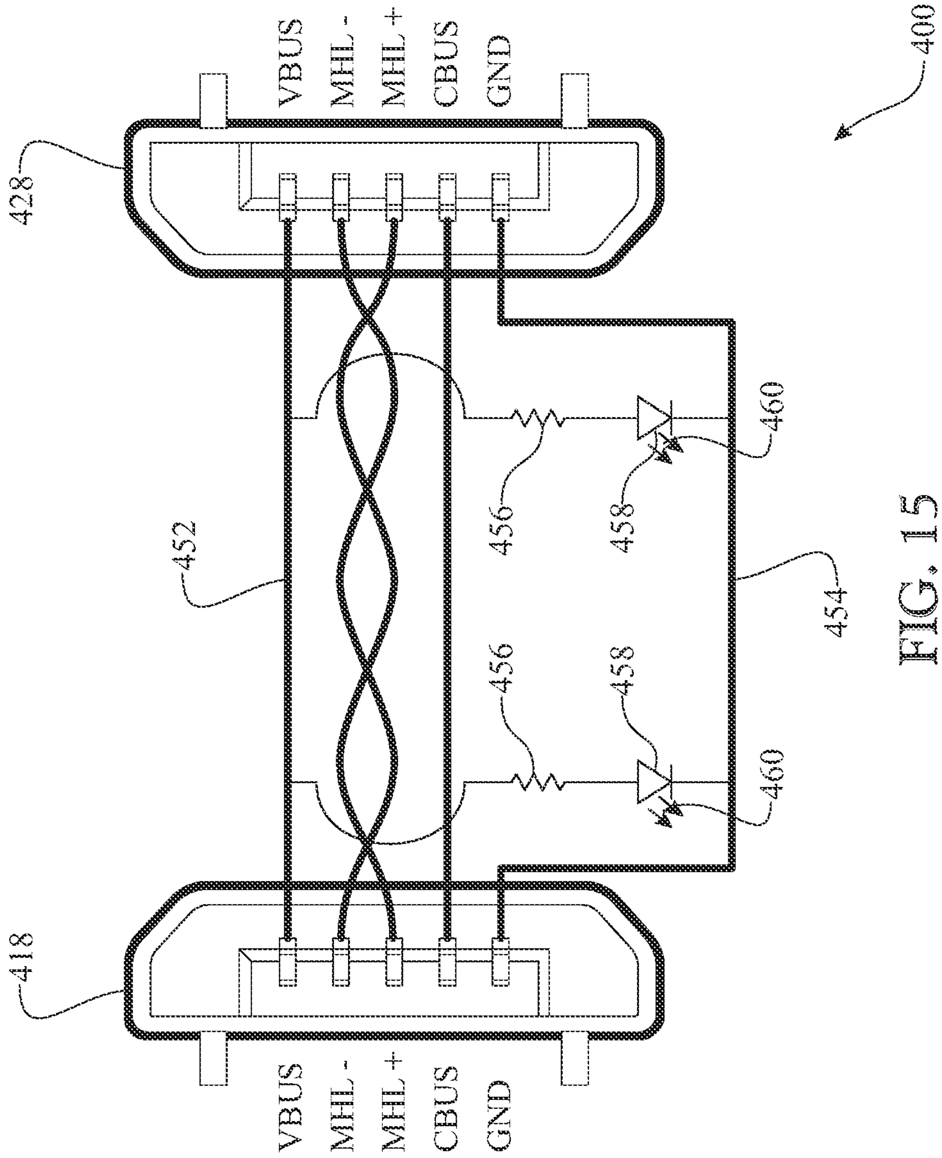
FIG. 15 presents an electrical schematic of the electronic cable of FIG. 9.

Within the back shell 424 the individual signal conductors are conductively affixed to the various electrical contacts 432 according to industry standards for micro-USB connectors. A light emitting diode (LED) 458 is positioned within the backshell 424 and proximate to the end cap lens 426. As illustrated in FIG. 15 a resistor 456 is connected in series between the anode of the light emitting diode (LED) 458 and is also connected to the VBUS lead 452. The cathode of the LED 458 is connected to the ground conductor (GND) 454.

In use, the electronic cable assembly 400 (and in like manner the electronic cable assembly 300) is utilized to interconnect two electronic devices such as a personal computer and a printer. When one of the connector assemblies 410, 420 is connected to a powered micro-USB socket on one of the devices, the electrical power on the VBUS lead 452 energizes the LED 458 which then emits a visible light 460 thereby illuminating the translucent end cap lens 426 wherein the illuminated end cap lens 426 further illuminates the micro-USB connector 420 extending therefrom. The LED 458 can be chosen from a series of monochromatic LEDs such that the light 460 emitted by the LED is of a predetermined color wherein the connector assemblies 410, 420 emit the same color when energized. Thus, the cable assembly 400 is color-coded and each cable assembly 400 utilized can be coded with a different color thereby readily distinguishing one electronic interface from another. Alternatively, the LED 458 can be of a type emitting white light when energized and the end cap lens 426 can be tinted a desired color. Further, the illumination from the LED 458 through the end cap lens 426 functions to illuminate the device panel into which the connector assembly 410, 420 is received thereby aiding the user to visualize the connections.

Figure 8:
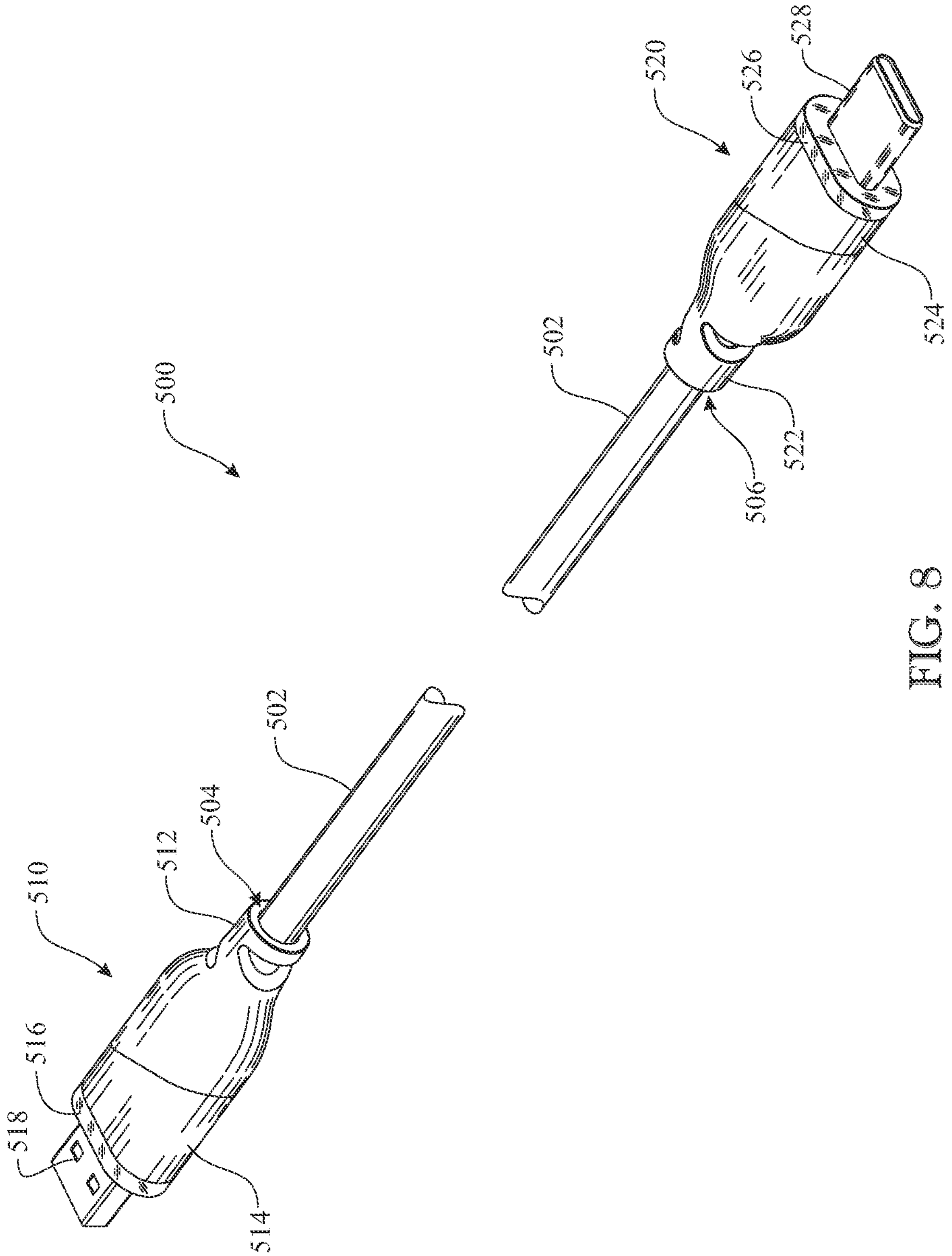
FIG. 8 presents a top isometric view of a USB electronic cable having a USB-A connector assembly with an illuminating end cap at one end thereof and a USB-C connector assembly with an illuminating end cap lens at an opposite end thereof.
Figure 9:
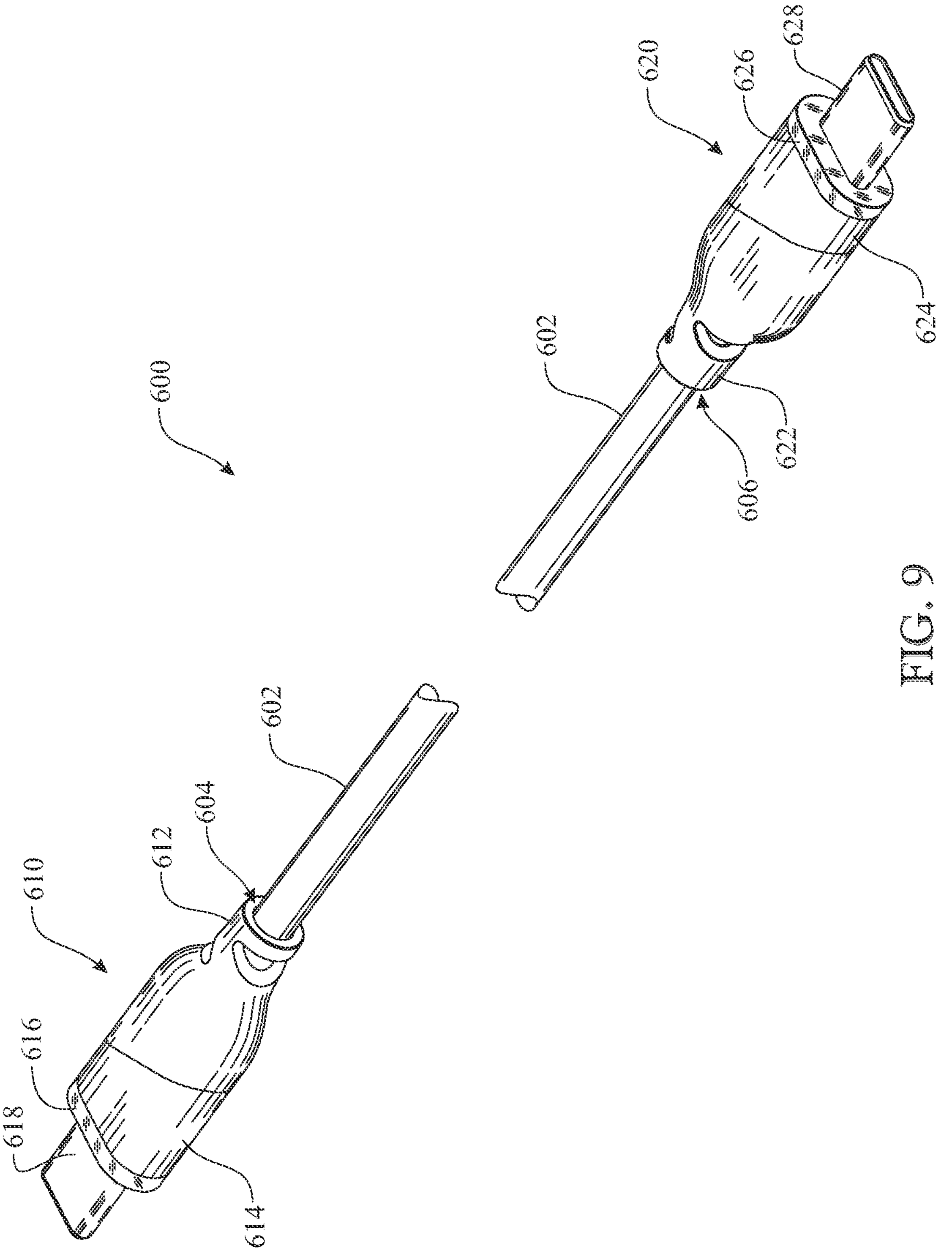
FIG. 9 presents a top isometric view of a USB electronic cable having USB-C connectors with an illuminating end cap lens at each end thereof.
Figure 10:
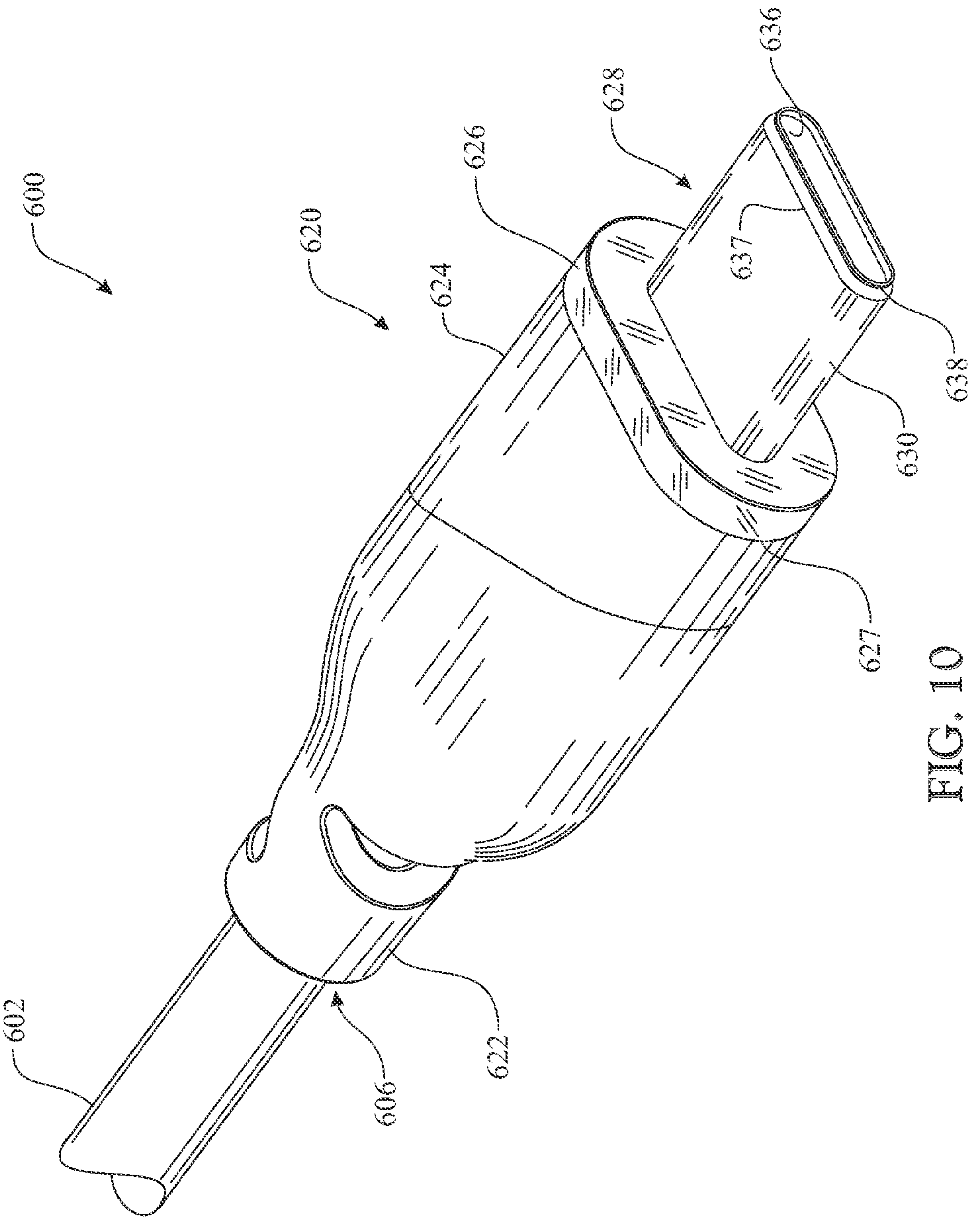
FIG. 10 presents an enlarged top isometric view of the micro-USB connector assemblies of the USB electronic cable of FIG. 9.

In a further embodiment of the invention and as illustrated in FIGS. 8, 9, and 10, an electronic USB cable assembly 500 is shown wherein a first USB-A connector assembly 510 according to the present invention, and identical to USB-A connector assembly 210, is affixed at a first end 504 of a multi-lead cable 502. A second connector assembly, this a USB-C connector assembly 520 according to the present invention, is affixed at a second end 506 of the cable 502 and is identical to USB-C connector assembly 620 as described below.

A similar USB cable assembly 600 is illustrated in FIG. 9 wherein a first USB-C connector assembly 610 according to the present invention is affixed at a first end 604 of a multi-lead cable 602. A second USB-C connector assembly 620 according to the present invention is affixed at a second end 606 of the cable 602. Each connector assembly 610, 620, as further shown in FIG. 10 (connector assembly 610 being identical to connector assembly 620), includes at an end thereof a USB-C connector 618, 628 respectively, of a known configuration. The USB-C connector 628 is of a plug configuration with a grounding sleeve 630. The grounding sleeve 630 can include a lip 638 affixed at an end 637 of the grounding sleeve 630 and together form a cavity 636 in which a plurality of signal contacts (not shown) is arranged for interfacing with like contacts in a receiving USB-C socket (not shown).

The USB-C connector assemblies 520, 610, and 620, are identical and as more clearly shown in FIG. 10 illustrating USB-C connector assembly 620, each includes an interface area 627 between a backshell 624 and the USB-C connector 628. Also positioned at the interface area 627 is an end cap lens 626 which is transmissible to light. The end cap lens 626 extends across a cross section of the backshell 624 such that a periphery of the end cap lens 626 conforms to the periphery of the backshell 624. The end cap lens 624 is affixed to the backshell 624 by chemical bonding, press fit, or other methods known in the art compatible with the respective materials of the backshell 624 and the end cap lens 626. A strain relief 622 is affixed to and extends from, or is integral with the back shell 624 to engage the cable 602 in a manner well known in the art.

Within the back shell 624 the individual signal conductors are conductively affixed to the various electrical contacts (not shown) according to industry standards for USB-C connectors. Similar to, and as illustrated in FIG. 15, a light emitting diode (LED) 458 is positioned within the backshell 424 and proximate to the end cap lens 626. A resistor 456 is connected in series between the anode of the light emitting diode (LED) 458 and is also connected to the VBUS lead 452. The cathode of the LED 458 is connected to the ground conductor (GND) 454.

In use, the electronic cable assembly 600 (and in like manner the electronic cable assembly 500) is utilized to interconnect two electronic devices such as a personal computer and a printer. When one of the connector assemblies 610, 620 is connected to a powered USB-C socket on one of the devices, (now referencing FIG. 15) the electrical power on the VBUS lead 452 energizes the LED 458 which then emits a visible light 460 thereby illuminating the translucent end cap lens 626 wherein the illuminated end cap lens 626 further illuminates the USB-C connector 620 extending therefrom. The LED 458 can be chosen from a series of monochromatic LEDs such that the light 460 emitted by the LED is of a predetermined color wherein the connector assemblies 610, 620 emit the same color when energized. Thus, the cable assembly 600 is color-coded and each cable assembly 600 utilized can be coded with a different color thereby readily distinguishing one electronic interface from another. Alternatively, the LED 458 can be of a type emitting white light when energized and the end cap lens 626 can be tinted a desired color. Further, the illumination from the LED 458 through the lens 626 functions to illuminate the device panel into which the connector assembly 610, 620 is received thereby aiding the user to visualize the connections.

Figure 11:
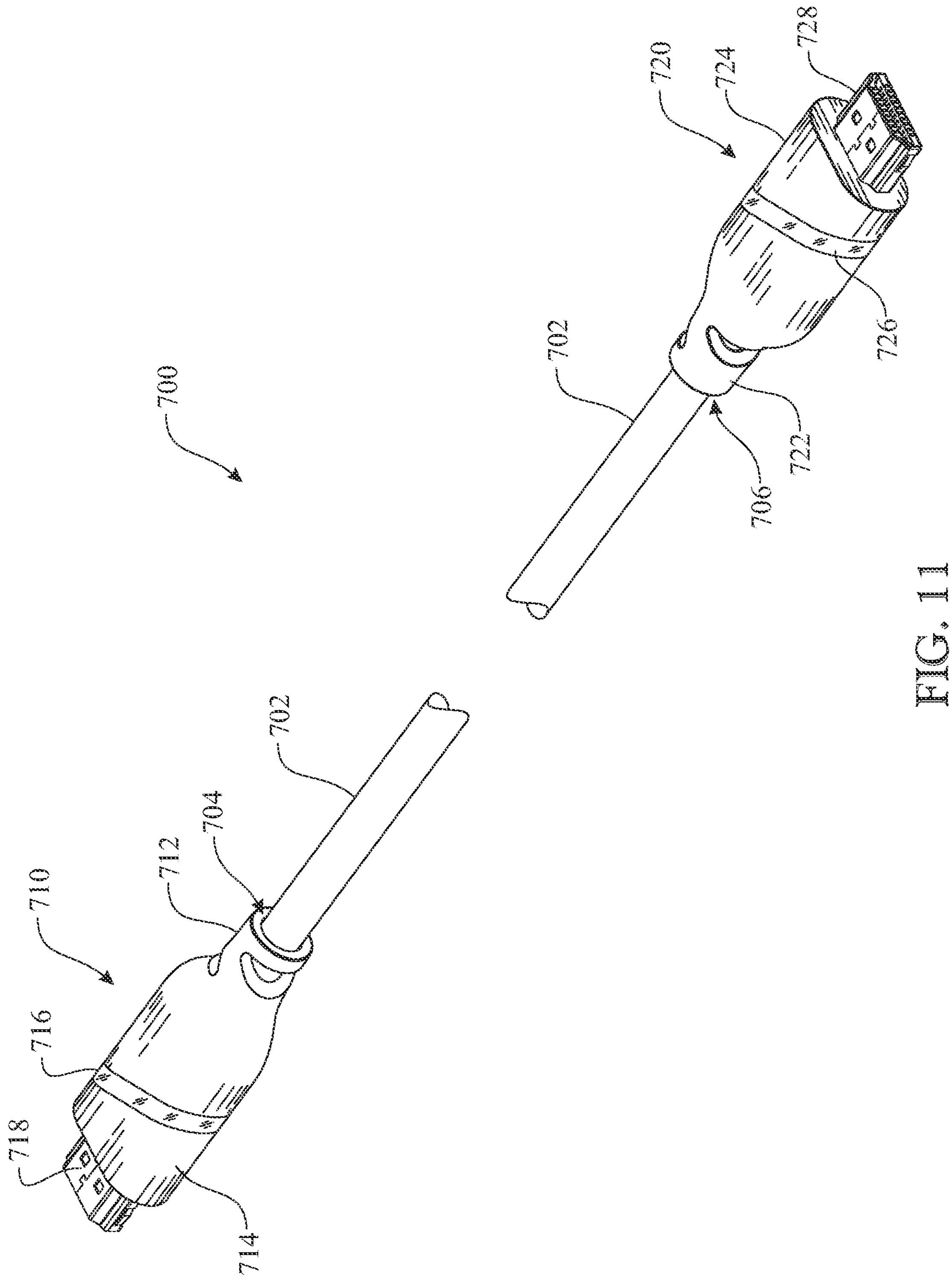
FIG. 11 presents a top isometric view of an HDMI electronic cable having HDMI connectors with a diagonally oriented illuminating lens at each end thereof.
Figure 12:
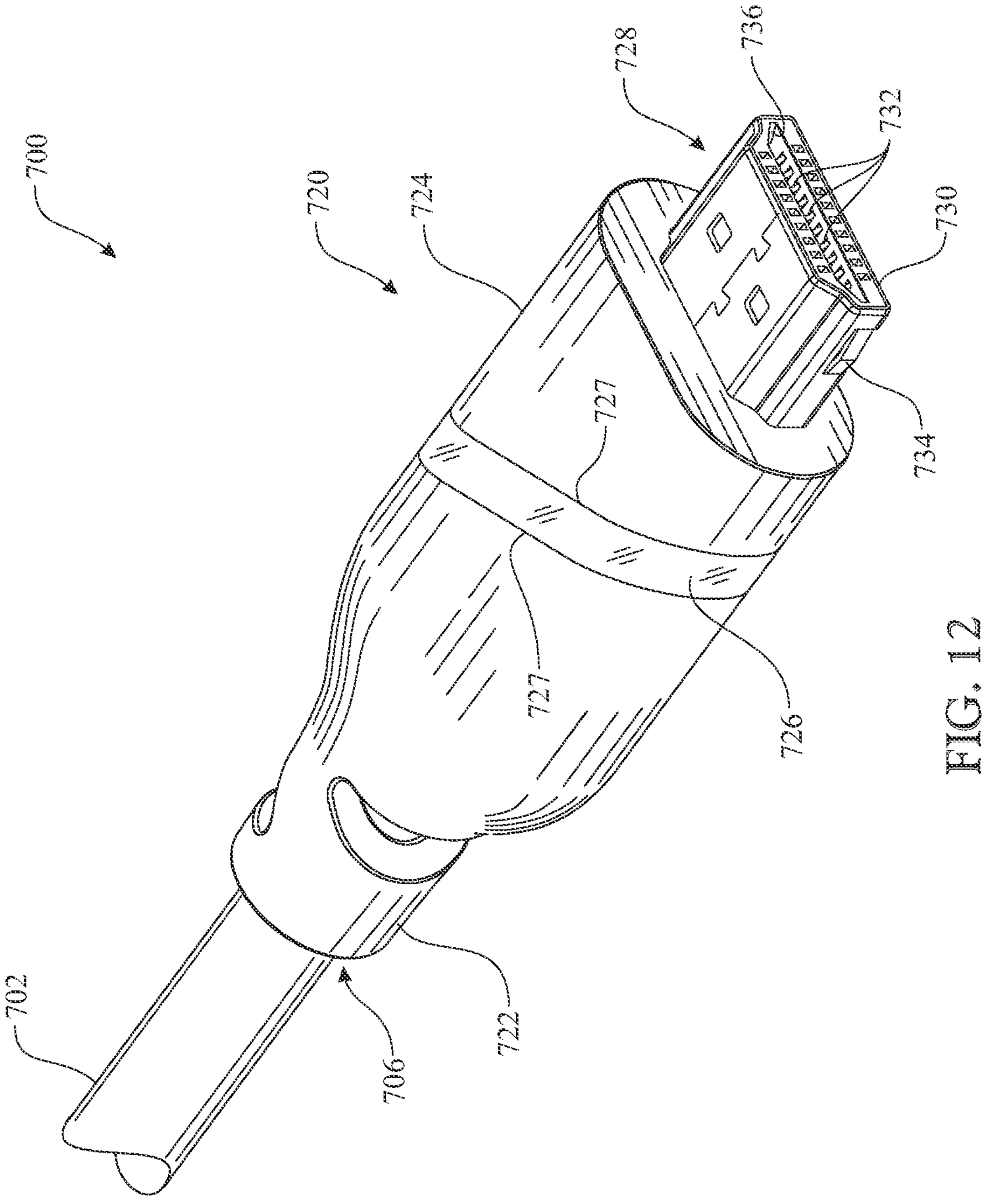
FIG. 12 presents an enlarged top isometric view of one of the HDMI connector assemblies of the HDMI electronic cable of FIG. 11.

An alternate configuration for an HDMI cable assembly 700 is illustrated in FIGS. 11 and 12, wherein a first HDMI connector assembly 710 according to the present invention is affixed at a first end 704 of a multi-lead cable 702. A second HDMI connector assembly 720 according to the present invention is affixed at a second end 706 of the cable 702. Each connector assembly 710, 720, as further shown in FIG. 12 (HDMI connector assembly 710 being identical to HDMI connector assembly 720), includes at an end thereof an HDMI connector 728 of a known configuration. The HDMI connector 728 is of a plug configuration with a grounding sleeve 730 including friction tabs 734 on each side thereof for retaining the HDMI connector plug 728 in a receiving HDMI socket (not shown). The grounding sleeve 730 forms a cavity 736 in which a plurality of signal contacts 732 are arranged for interfacing with like contacts in a receiving HDMI socket (not shown).

The HDMI connector assembly 710, 720, and as more clearly shown in FIG. 12, includes an interface area 727 at an intermediate position of a backshell 724. The interface area 727 transects the backshell 724 at an acute angle with respect to a longitudinal axis of the backshell 724. Also positioned at the interface area 727 is a correspondingly diagonally oriented lens 726 which is transmissible to light. The lens 726 extends through the transected backshell 724 such that a periphery of the lens 726 conforms to the periphery of the backshell 724. The lens 726 is affixed to the back shell 724 by chemical bonding, press fit, or other methods known in the art compatible with the respective materials of the backshell 724 and the end cap lens 726. Alternatively, the interface area 727 can transect the backshell 724 laterally at a right angle with respect to the longitudinal axis of the backshell 724 wherein the lens 726 can be similarly laterally oriented with respect to the longitudinal axis of the backshell 724. A strain relief 722 is affixed to and extends from the back shell 724 to engage the cable 702 in a manner well known in the art.

Within the back shell 724 the individual signal conductors are conductively affixed to the various electrical contacts 732 according to industry standards for HDMI connectors. Schematically, the electrical connections within the backshell 724 are as illustrated in FIG. 13 for HDMI cable assembly 100. A light emitting diode (LED) 158 is positioned within the backshell 724 and proximate to the lens 726. A resistor 156 is connected in series between the anode of the light emitting diode (LED) 158 and the +5 Volt conductor 152. The cathode of the LED 158 is connected to the ground conductor 154.

In use, the electronic cable assembly 700 is utilized to interconnect two electronic devices such as a personal computer and a video monitor. When one of the connector assemblies 710, 720 is connected to a powered HDMI socket on one of the devices, the +5 V power energizes the LED 158 which then emits a visible light 160 thereby illuminating the diagonally oriented lens 726 wherein the illuminated lens 726 further illuminates the area immediately adjacent the backshell 724. The LED 158 can be chosen from a series of monochromatic LEDs such that the light 160 emitted by the LED is of a predetermined color wherein the connector assemblies 710, 720 emit the same color when energized. Thus, the cable 700 is color-coded and each cable 700 utilized can be coded with a different color thereby readily distinguishing one electronic interface from another. Alternatively, the LED 158 can be of a type emitting white light when energized and the lens 726 can be tinted a desired color. Further, the illumination from the LED 158 through the lens 726 functions to illuminate the area proximate to the device panel into which the connector assembly 710, 720 is received thereby aiding the user to visualize the connections.

The above description is considered that of certain embodiments of the present invention only. Modifications of the invention will occur to those skilled in the art and to those who make or use the invention. Such modifications include, but are not limited to, the inclusion of a diagonally oriented lens (i.e., as described above with respect to HDMI connector assembly 720) transecting back shells of connector assemblies in lieu of the end cap lens of USB-A, USB-C, and micro-USB connector assemblies as described herein. Therefore, it is understood that the embodiments described herein are merely for illustrative purposes only and are not intended to limit the scope of the invention hereof.

We claim:

1. An electronic cable of the type having a plurality of electrical leads extending between an electronic signal interface connector assembly at each end thereof wherein each electronic signal interface connector assembly comprises:

a backshell supporting an electronic signal connector extending from one end thereof;

the electronic signal connector having a plurality of signal contacts within a grounding sleeve, the signal contacts conductively affixed to respective ones of the plurality of electrical leads;

a light transmissible lens affixed to an end of the backshell, the lens extending across a cross-section of the backshell, a periphery of the lens conforming to an external periphery of the backshell; and a light emitting diode positioned within the backshell and proximate to the lens, the light emitting diode further electrically connected between a power lead and a ground lead within the backshell, the light emitting diode oriented to emit light at the lens when energized, the light transmitted through the lens illuminating an area external to and at least about an external periphery of the backshell.

2. The electronic cable according to claim 1 wherein the light transmissible lens is affixed to an end of the backshell and is positioned at an interface of the backshell and the electronic signal connector.

3. The electronic cable according to claim 1 wherein when the light emitting diode in the electronic signal connector assembly is energized, the light transmitted through the lens illuminates about the external periphery of the backshell and further illuminates the electronic signal connector.

4. The electronic cable according to claim 1 wherein the light transmissible lens transects the backshell.

5. The electronic cable according to claim 4 wherein the light transmissible lens transects the backshell at a right angle with respect to a longitudinal axis of the connector backshell.

6. The electronic cable according to claim 4 wherein the light transmissible lens transects the backshell at an acute angle with respect to a longitudinal axis of the connector backshell.

7. The electronic cable according to claim 6 wherein when the light emitting diode in the electronic signal connector assembly is energized, the light transmitted through the lens illuminates an area about an external periphery of the backshell.

8. The electronic cable according to claim 1 wherein the lens is transparent.

9. The electronic cable according to claim 1 wherein the lens is translucent.

10. The electronic cable according to claim 1 wherein the light emitting diode in each electronic signal connector assembly emits the same color.

11. The electronic cable according to claim 1 wherein the light emitting diode in each electronic signal connector assembly emits white light, and further wherein each light transmissible lens is tinted the same color.

12. The electronic cable according to claim 1, wherein the light transmissible lens illuminating an area about the external periphery of the backshell transmits light on at least two sides of that external periphery.

13. The electronic cable according to claim 1, wherein the light transmissible lens illuminating an area about the external periphery of the backshell transmits light on at least three sides of that external periphery.

14. The electronic cable according to claim 1, wherein the light transmissible lens illuminating an area about the external periphery of the backshell transmits light on four sides of that external periphery.

15. An electronic cable of the type having a plurality of electrical leads extending between an electronic signal interface connector assembly at each end thereof wherein each electronic signal interface connector assembly comprises:

a backshell supporting an electronic signal connector at one end thereof wherein the electronic signal connector is selected from a group consisting of the types HDMI, USB-A, micro-USB, and USB-C, the electronic signal connector having a plurality of signal contacts within a grounding sleeve, the signal contacts conductively affixed to respective ones of the plurality of electrical leads;

a light transmissible lens affixed to the backshell, the lens extending across a cross-section of the backshell, a periphery of the lens conforming to the external periphery of the backshell; and a light emitting diode positioned within the backshell and proximate to the lens, the light emitting diode further electrically connected between a power lead and a ground lead within the backshell, the light emitting diode positioned proximate to the light transmissible lens and oriented to emit light at the lens when energized, the light transmitted through the lens illuminating an area external to and at least about an external periphery of the backshell.

16. The electronic cable according to claim 15 wherein the light transmissible lens is affixed to an end of the backshell and is positioned at an interface of the backshell and the electronic signal connector.

17. The electronic cable according to claim 15 wherein the light transmissible lens transects the backshell at a right angle with respect to a longitudinal axis of the connector backshell.

18. The electronic cable according to claim 15 wherein the light transmissible lens transects the backshell at an acute angle with respect to a longitudinal axis of the connector backshell.

19. The electronic cable according to claim 15 wherein the light transmissible lens is translucent.

20. The electronic cable according to claim 15 wherein the light transmissible lens is transparent.

21. The electronic cable according to claim 15 wherein the light emitting diode in each electronic signal connector assembly emits the same color.

22. The electronic cable according to claim 15 wherein the light emitting diode in each electronic signal connector assembly emits white light, and further wherein each light transmissible lens is tinted the same color.

23. The electronic cable according to claim 15, wherein the light transmissible lens illuminating an area about the external periphery of the backshell transmits light on at least two sides of that external periphery.

24. The electronic cable according to claim 15, wherein the light transmissible lens illuminating an area about the external periphery of the backshell transmits light on at least three sides of that external periphery.

25. The electronic cable according to claim 15, wherein the light transmissible lens illuminating an area about the external periphery of the backshell transmits light on four sides of that external periphery.

26. An electronic cable of the type having a plurality of electrical leads extending between an electronic signal interface connector assembly at each end thereof wherein each electronic signal interface connector assembly comprises:

a backshell supporting an HDMI connector extending from one end thereof, the HDMI connector having a plurality of signal contacts within a grounding sleeve, the signal contacts conductively affixed to respective ones of the plurality of electrical leads;

a light transmissible translucent lens affixed to an end of the backshell at an interface between the backshell and the HDMI connector, the lens extending across a cross-section of the backshell and a periphery of the lens conforming to the external periphery of the backshell; and a monochromatic light emitting diode positioned within the backshell proximate to the lens and electrically connected between a power lead and a ground lead within the backshell, when energized each light emitting diode emitting light of the same color through the light transmissible lens and illuminating an area about the external periphery of the backshell and further illuminating the electronic signal connector.

27. The electronic cable according to claim 26, wherein the light transmissible lens illuminating an area about the external periphery of the backshell transmits light on at least two sides of that external periphery.

28. The electronic cable according to claim 26, wherein the light transmissible lens illuminating an area about the external periphery of the backshell transmits light on at least three sides of that external periphery.

29. The electronic cable according to claim 26, wherein the light transmissible lens illuminating an area about the external periphery of the backshell transmits light on four sides of that external periphery.

* * * * *